United States Patent Office 2,979,391
Patented Apr. 11, 1961

2,979,391

DEFOLIATION

Francis X. Markley, Bound Brook, N.J., assignor to Pittsburgh Coke & Chemical Company, Pittsburgh, Pa., a corporation of Pennsylvania No Drawing. Filed Sept. 12, 1958, Ser. No. 760,548

4 Claims. (Cl. 71—2.7)

This application is a continuation-in-part of application Serial No. 658,026, filed May 9, 1957, now abandoned.

This invention relates to the defoliation of crops, to the preparation of agricultural plants for harvesting, and to forced maturing. This invention also relates to control of economic pests by altering the life-cycle of botanical hosts.

It has been recognized for many years that in order to reap the optimum crop from a large variety of plants in particular those plants of luxuriant growth yielding a crop which is field-harvested, it is desirable to alter the growth of these non-harvestable, functional organs of the plane in order to render accessible, or hasten the maturity of the harvestable portions.

It is well known that during the normal life process of a herbaceous plant, the leafy portions drop as a result of change in a group of specialized cells at the base of the petiole. The outward effect is the result of development of an abscission layer composed of meristematic cells developed across the base of the petiole. The mechanism of these changes is essentially little understood, but a number of external, naturally occurring factors are known to produce this inner growth effect. For example, in certain species, a decrease in ambient temperature at the proper period in the life cycle of the plant causes the natural formation of the abscission layer. Likewise, an injury, through disease or adverse growing conditions will be conducive to such abscission layer, resulting in the sloughing-off by the plant of the injured member. A number of additional causes of natural origin, or abnormally imposed by nature on the plant, bring about defoliation.

In the past, it has been proposed to effect defoliation by applying to the plants chemicals having herbicidal activity. However, application of such destructive material has failed to provide defoliants of commercial significance. When such materials are applied, a variety of effects may result, any one of which interferes with the normal harvesting of a crop. For example, herbicides of the hormonal type cause epinasty of the plant without prompt defoliant and renders difficult, or even impossible, machine harvesting. Other herbicidal chemicals cause a general wilting condition so that the plants do not remain upright, again interfering with mechanical harvesting. Still other herbicidal chemicals have been suggested as cotton defoliants but suffer from the disadvantage that desiccation occurs. Desiccated cotton plants do not permit harvesting of the commercial portions of the plant without removing in the same operation the desiccated leaves. In general, when plant desiccation occurs, the leaves tend to freeze on the plant and frequently cannot even be removed prior to harvest by shaking or mechanically contacting the plant.

In addition to the disadvantages illustrated above of applying herbicidal chemicals in the usual fashion to plants for defoliant purposes, secondary effects of an undesirable nature are produced. In addition, certain materials have been proposed as defoliants which are not herbicidal but suffer from the serious disadvantage of being non-adherent, or removed by weathering, resulting in the necessity of repeated and costly applications. Such materials must be applied during a limited and critical period during the growing season to achieve any success whatsoever.

However, the phenomenon of plant desiccation, when cosidered in terms of other valuable crops than cotton, can be used to advantage in harvesting. Thus, with the various grass crops and certain grain crops, dehydration in the field before harvesting permits a greater latitude in the subsequent operations. Thus, in preparing windrows in the field the likelihood of premature decay is minimized. Also in bulk storage or baling, dehydration or desiccation before harvesting improves the yield and lessens the likelihood of decay occurring during the ultimate drying process.

The present invention has for an object the provision of formulations and methods effective in causing defoliation without exerting a general herbicidal action to the crop. A further object of this invention is the provision of materials and methods for preparing agricultural crops for harvest. A further object is to control pest infestation by altering the life-cycle of hosts for such agricultural pests. Likewise, it is an object of this invention to provide compositions which enhance the value of agricultural crops, hasten the maturity thereof, and permit optimum harvest to be obtained. Still further objects will be apparent from the further description of this invention hereinafter.

The phytoregulation and resulting improvement in crop value and indirect control of pest infestation is achieved by providing and applying compositions containing as the principle active ingredient an organic ester of a sulfur containing acid of phosphorus wherein phosphorus is linked exclusively to a chalkogen of atomic weight up to 32, i.e., oxygen or sulfur, and wherein said ester contains 1 to 3 sulfur atoms. Thus the active ingredient of the defoliant composition of this invention can be represented by the general formula $$\begin{array}{c} RX \\ RY-P \\ RZ \end{array}$$

where X, Y and Z are oxygen or sulfur, at least one of X, Y and Z being sulfur. The compounds utilized according to the invention are thus tertiary thiophosphites.

The radicals R are the same or different hydrocarbon or halohydrocarbon radicals containing 1 to 14 carbon atoms. When P is aliphatic it is preferred to employ radicals containing between about 3 to 5 carbon atoms.

Specific illustrative examples of the active ingredients in the non-herbicidal defoliant compositions of this invention include tri (2-chloropropyl) monothiophosphite, tri (2-ethylpropyl) dithiophosphite; tri (2-chloropropyl) dithiophosphite, tri (B-bromo isopropyl) dithiophosphite, triphenyl dithiophosphite, triphenyl trithiophosphite, tri isopropyl dithiophosphite, tri isopropyl monothiophosphite, tri isopropyl trithiophosphite, tributyl monothiophosphite, tributyl dithiophosphite, tri (m-cresyl) triophosphite, O,O-diethyl - 1 - S(2,3,4,5-tetrachloro cyclohexyl) monothiophosphite, trimethyl trithiophosphite, trimethyl monothiophosphite, dimethyl ethyl trithiophosphite, O-methyl-(S,S)-diethyl dithiophosphite, S,S-dimethyl-O-n-propyl dithiophosphite, tri-n-propyl dithiophosphite, O-methyl-S-ethyl-S-propyldithiophosphite, O-methyl-S-ethyl S-n-butyl dithiophosphite, tri-n-hexyl dithiophosphite, O-butyl-(S,S) diheptyl dithiophosphite, O-isooctyl-S, S-diisooctyl dithiophosphite, tritetradecyl monothiophosphite, tritetradecyl trithiophosphite, trioctylphenyl trithiophosphite, tri naphthyl monothiophosphite, tri (2,4-tri-methylphenyl) thiophosphite, tri (3-chloro-4-methylphenyl) thiophosphite and the like.

Organic phosphorus compounds have received considerable attention in the past and more recently have been suggested as insecticides. Indeed, one of the principal advantages of the phosphorus-containing insecticides, in addition to their universality, is the absence of any phytoregulatory function permitting application at effective dosage levels on growing agricultural crops without damage thereto. In this regard, it is interesting to note that materials closely related to the foregoing ingredients of the compositions of this invention have been suggested for this use. Among these may be exemplified the dialkyl chloroaryl thiophosphates, as disclosed in U.S. Patents Nos. 2,599,512, 2,599,515, 2,599,516, the dialkyl chloroarylphosphates as suggested in U.S. 2,599,375, the dialkyl chloro-thiophosphates as shown in U.S. 2,663,723, the trialkylphosphates of U.S. 2,552,325 and the O,O-dialkyl-O-alkylmercapto-alkyl thiophosphates in U.S. 2,571,989. This last class is of particular interest in connection with the foregoing as they have been suggested as systemic insecticides which inherently must be non-phytoregulatory. In contrast, certain trivalent organic phosphorus compounds, for example, the triisooctyl phosphites of U.S. 2,722,479 are effective preemergence herbicides. It will be noted that none of the materials disclosed in the art discussed hereinabove contains all the essential ingredients of the materials of this invention as shown by the foregoing formula and which are effective by virtue of their combination with properly selected surface contacting agents.

By practicing the present invention organic esters of sulfur-containing phosphorus compounds as defined heretofore are applied so that while there is no general herbicidal action, either a specific defoliant action can be obtained or controlled dehydration or desiccation can be obtained. Furthermore hormonal herbicidal action can be obtained without tissue damage and epinasty of the plant and resulting loss in the defoliant action desired. The method of control is dependent upon preparation of non-herbicidal formulations of appropriate concentrations of active ingredient and application thereof to the selected crop at a controlled dosage level. For purposes of either defoliation or dehydration, the active ingredient is present between the limits of between about 0.1 and 10 weight percent in the finished formulation. In order to achieve defoliation of deciduous plants as cotton, soy bean, lima and string beans, apple and peach trees and the like, the formulations of this invention are employed at a rate of between about 0.5 and 3 pounds of active ingredient per acre. Under unusual concentrations, this upper limit may be increased to 6 pounds per acre but at such concentrations with cotton crops, there is a tendency of burning the crop or freezing the leaves with consequent lessened results in defoliation. With short varieties of cotton it is preferred to employ between about 0.5 and 1.5 pounds of active ingredient per acre and with the tall growing varieties between about 1.5 and 3 pounds per acre. In general, for most purposes, satisfactory results are obtained when the organic sulfur containing esters of phosphorus are formulated in non-herbicidal aqueous emulsions containing a surface active agent at concentrations of 0.1 to 10 weight percent and are applied at a dosage rate of between about 1 and 2 pounds per acre. For purposes of dehydration or plant desiccation in the field, for such crops as alfalfa, timothy, clover and the like, grass crops or the cereals such as rice, wheat and the like, the above formulations are applied thereto at a dosage level between about 4 to 10 pounds of active ingredient per acre.

Thus, improvement in commercially important agricultural crops while standing in the field can be achieved by practicing this invention by applying non-herbicidal formulations of triorganic sulfur-containing esters of phosphorus thereto at a rate of 0.5 to 10 pounds per acre.

In order to achieve the non-herbicidal defoliant or dehydration activity of this invention, organic sulfur-containing esters of phosphorus are compounded with non-herbicidal surface active agents and non-herbicidal carriers. In certain instances, the dispersing property is obtained by the carrier and in such instances, the term surface-active agent is used to describe the carrier. For most applications, a liquid formulation is preferred and, as the active ingredients of the formulations of this invention are themselves liquids, such formulations are most readily and conveniently prepared. Typical non-herbicidal carriers which can be employed comprise aliphatic hydrocarbons, and ethers of poly-hydric alcohols. Typical examples of the aliphatic hydrocarbons which are suitable for providing the non-herbicidal formulations of this invention are included refined mineral oils, petroleum hydrocarbon fractions having not more than 5 percent olefins and not more than 10 percent aromatic hydrocarbons, white oil, heavy alkylate, and in general, alkyl or cycloalkyl hydrocarbons having between about 6 and 20 carbon atoms. The ethers of polyhydric alcohols suitable as non-herbicidal carriers in the formulation of this invention include the dimethyl ether of diethylene glycol, and the corresponding diethers of polyethylene glycols such as, for example, hexamethylene glycol, tetramethylene glycol, and the like. In general, it is preferred in this embodiment of the formulations of this invention, to employ diethers containing from 1 to about 6 carbon atoms in the aliphatic radicals and from 2 to about 12 carbon atoms in the polyhydric radical and such polyhydric radicals can contain in the chain one or more ether linkages up to about 6.

When employing the non-herbicidal carriers illustrated above in the formulations of this invention, non-herbicidal surface active agents are likewise employed so as to provide in the ultimate aqueous formulation a well-emulsified mixture suitable for crop application. In general, the common surface active agents of the type of soaps and synthetic detergents are non-herbicidal when employed in the concentrations required to achieve formulations that are satisfactory for this invention. In general, such surface active agents are employed in amounts between about 0.1 to 5.0 parts per 100 parts of active ingredient. Typical of such ingredients are salts of the alkyl and alkylaryl sulfonates, such as the sodium salt or sulfonated ethyl oleate; the sodium salt of sulfonated oxidized petroleum oils; sodium decylbenzene sulfonate; potassium dodecyl benzene sulfonate; the sodium salt of sulfonated ethyl oleylamide; alkyl sulfates, such as sodium lauryl sulfate, sodium oleyl sulfate, ammonium ricinoleyl sulfate, and the like; alkylaryl polyether alcohols, such as alkyl phenoxy polyethoxy-ethanol wherein the alkyl can be $C_1$ to $C_{20}$, the condensation product of ethylene oxide and alkylated cresol, and polyoxy ethylene thioether; fatty acid esters of polyhydric alcohols, such as mannitol monolaurate, and sorbitan monooleate; and the ethylene oxide addition products of such esters, such as the polyoxy ethylene derivatives of sorbitan monooleate, and the like.

The organic esters of a sulfur containing acid of phosphorus utilized in this invention are prepared by methods adequately described in the literature, for example, Kosolapoff, "Organic Phosphorus Compounds," Wiley, 1950. One convenient procedure comprises reacting two molar equivalents of an organo mercaptan and one molar equivalent of an organo alcohol with one molar equivalent of phosphorus trichloride. Thus, for example, when 515.2 parts of n-propyl mercaptan and 46 parts of ethyl alcohol are reacted with 137.4 parts of phosphorus trichloride at a temperature of between about 10 to 15° C. in the presence of benzene as a solvent and 237 parts of pyridine as a catalyst, S,S-di-n-propyl-O-ethyl dithiophosphite is produced in high purity and good yield.

Example I

To 100 parts of mineral oil is added tri(2-ethylpropyl) dithiophosphite in the amount of 5 parts. A composition suitable for application is made from this concentrate by further diluting with the oil to a final thiophosphite concentration of 0.5 weight percent. When applied to cotton plants, the above formulation exhibits effective defoliation.

Likewise similar oil formulations of tribenzyl tri-thiophosphate, O,O,S-triphenyl thiophosphite, O,S,S-trinaphthyl dithiophosphite, triphenyl trithiophosphite, O,O-dipenyl-S-benzyl thiophosphite, and the like can be prepared. Other oils such as kerosene, toluene, xylene, cumene, etc. can be used with good results and these oil formulations can have incorporated with them surface active agents such as those illustrated below.

For certain applications the defoliant compositions of this invention are preferably employed suspended in the conditioning agent. Such suspensions can be made by one of the following methods: A concentrated oil solution of the active ingredient is prepared, and this is added to water containing a dispersing agent; a solution of one of the defoliants in a water-soluble solvent is prepared which is thereupon added to water containing a dispersing agent; or a water suspension of the defoliant is prepared and added to an oil in the presence of a dispersing agent. Thus, a water and oil emulsion of the active ingredient can be prepared. Examples of typical dispersing agents which can be employed in forming dispersions include salts of the alkyl and alkylaryl sulfonates, such as the sodium salt of sulfonated ethyloleate, the sodium salt of sulfonated oxidized petroleum oils, dioctylsodium sulfosuccinate, sodium decylbenzene sulfonate, potassium dodecylbenzene sulfonate, and the sodium salt of sulfonate ethyloleylamide; alkyl sulfates, such as sodium lauryl sulfate, sodium oleyl sulfate, ammonium ricinoleyl sulfate, and the like; alkylaryl polyether alcohols, such as alkyl phenoxy, polyethoxy ethanol (alkyl can be methyl to $C_{20}$), the condensate of ethylene oxide and alkylated cresol, polyoxy ethylene thioether, and the like; fatty acid esters of polyhydric alcohols, such as mannitol monolaurate, sorbitan monooleate, and the like; and the ethylene oxide addition products of such esters, such as the polyoxy ethylene derivative of sorbitan monooleate, etc.

The following examples typify methods of preparing the above formulations.

Example II

A formulation of tri(2-chloropropyl) tri thiophosphite is prepared by intimately admixing 10 parts of this material with 90 parts of water containing 0.1 part of polyoxy ethylene thioether. Ten parts of this aqueous suspension is thereupon added to 190 parts of T-942-B oil to form a final formulation consisting of 0.5 weight percent of active ingredient in an oil-in-water emulsion containing a surface active agent. This material in its final dilution is an effective cotton defoliant.

Equally good oil and water emulsions having high defoliant activity are similarly prepared from the following materials: O,O-di(2-chloro-n-propyl)-S-methyl thiophosphite, O,O-di(2-bromo-n-butyl)-S-methyl thiophite, O-ethyl-(S,S)-dimethyl dithiophosphite, and the like.

Example III

A 10 percent solution of tri-n-butyl thiophosphite is prepared in methyl alcohol, and the resulting solution is added to 100 parts of water containing 1 part of sodium lauryl sulfate to provide an aqueous suspension comprising one percent of the active ingredient in an alcohol-water mixture.

In a similar manner are prepared such suspensions of triamyl thiophosphite, O-methyl-S-n-butyl-S-propyl dithiophosphite, O,O-di-tert-butyl-S-n-butyl dithiophosphite and similar materials with equal effectiveness. Other organic solvents which can be used in such formulations include Carbitol, Cellosolve, methyl Cellosolve, acetone, isophorone, methyl isobutyl ketone, methyl ethyl ketone, isopropanol and the like. A variety of the surface active agents of the type indicated above can be used.

Example IV

A mixture of 50 parts of tri(2-chloropropyl)monothiophosphite, 100 parts of bentonite and 0.5 part of calcium dodecylbenzene sulfonate is treated in a ball mill for a period of one-half hour. At the end of this period the mixture is screened to pass a 100-mesh sieve. This 50 weight percent wettable powder formulation is further treated to form a suspension suitable for application by adding with agitation 100 parts of the wettable powder to 1,000 parts of water. The resulting aqueous suspension of the solid surface-contacting agent and defoliant is suitable for spraying directly upon crops.

Example V

An emulsifiable concentrate is prepared by treating 10 parts of tri(2-ethylpropyl)dithiophosphite with 65 parts of cyclohexanone, 20 parts of xylene, and 5 parts of sodium alkylaryl sulfonate. This concentrate is further diluted with water so as to contain one percent active ingredient to make an effective defoliant formulation.

Typical of the thiophosphites which can be so formulated to provide efficient defoliating formulations include S,S-di-n-butyl-O-methyl dithiophosphite, O-t-butyl-S,S-dimethyl dithiophosphite, O-2-isopropyl amyl-S,S,-di-n-hexyl dithiophosphite, O,O,S-trimethyl thiophosphite and the like.

Example VI

An oil concentrate is prepared by dissolving 100 parts of O-n-propyl-S,S-di-n-propyl dithiophosphite in 90 parts of xylene containing 10 parts of a commercially available blend of a polyalcohol carboxylic acid ester and a sulfonated oil. This clear, non-phytotoxic defoliant concentrate can be directly added to water with only mild agitation to prepare dilute formulations effective for application to the field crop.

Example VII

A formulation of O-n-butyl-S,S-n-butyl dithiophosphite was prepared by finely grinding 10 parts of this material with 90 parts of water containing 0.1 part of polyoxyethylene sorbitan monooleate. Ten parts of this aqueous suspension was thereupon added to 200 parts of T-942-B to form a final formulation consisting of 0.5 weight percent of O-n-butyl-S,S-n-butyl dithiophospite in an oil-in-water emulsion containing a surface active agent.

Example VIII

Following the procedure of Example VII, O-n-propyl-S-2-methyl-n-butyl-S-n-amyl dithiophosphite was dissolved in Carbitol to the extent of 10 weight percent. This solution was added with agitation to water containing one weight percent polyoxyethylene sorbitan monooleate to provide a one percent concentration of O-n-propyl-S-2-methyl-n-butyl-S-n-amyl dithiophosphite in suspension in 10 percent Carbitol-in-water.

Example IX

Following the procedure of Example VIII, triphenyl tri thiophosphite was dissolved in Carbitol to the extent of 10 weight percent. This solution was added with agitation to water containing one weight percent Tween-80 to provide a one percent concentration of thionophosphate in suspension in 10 weight percent Carbitol-in-water.

Example X

A 10 percent solution of phenyl-1-naphthyl-3-anthryl-thiophosphite was prepared in methyl alcohol and the resulting solution was added to 100 parts of water containing 1 part of Nacconol-NR to provide an aqueous suspension comprising 1 percent of the active ingredient in an alcohol-water mixture.

For certain applications, particularly when defoliants are applied to plants during the active growing season and regrowth of new leaves might occur and be undesirable, it is possible to employ along with these defoliants any of several agents designed to stunt the growth of the plant. A typical example of such materials is maleic hydrazide. In addition to maleic hydrazide it is sometimes desirable to employ a material such as sucrose to enhance the ability to prevent regrowth of the leafy structures of the plants. Furthermore, an adherent agent can be employed along with such defoliants, if this is desired, without interfering with the activity thereof. Likewise, it is possible to employ humectants along with the defoliants, particularly when dry formulations are employed.

A number of methods are available for applying the defoliants of this invention, including power driven spray, hand spray, aircraft spraying, and the like. The materials of this invention are particularly advantageous in the latter method of application in that the oil formulations illustrated above can be employed to advantage in that good adherence and little drifting is encountered. Thus, one of the major drawbacks to the commercial utilization of previously suggested defoliants has been overcome by this embodiment of the invention.

The rate of application in terms of active ingredient can vary within the limits described above depending upon atmospheric conditions, the growing conditions under which the crop matured, the particular species of plant type being defoliated or dehydrated and the period of the growth cycle.

*Example XI*

Cotton variety Deltapine 15 was grown under favorable conditions. The growing conditions were good and the cotton production approximately 1.5–2 bales per acre. Employing aqueous defoliant compositions of S,S-di-n-butyl-o-n-butyl dithiophosphite from a tractor mounted spray delivering 28 gallons of liquid composition per acre, 78 percent defoliation was achieved employing an active ingredient at such concentration that its dosage rate was 2 pounds per acre. Increasing the concentration to 6 pounds per acre, 69 percent defoliation was achieved, however at this rate, some desiccation was observed.

Under similar field conditions and methods of application the following compounds produce comparable results: O-methyl-S-ethyl-S-propyl dithiophosphite, O,O,S-trimethyl phosphite and the like.

I claim:

1. A method of defoliating cotton which comprises applying thereto when the plant contains bolls, in an amount effective to defoliate the cotton, a trimonohaloalkyl thiophosphite having 1 to 3 sulfur atoms linking the haloalkyl groups to the phosphorus atom, the balance of the linking atoms between the alkyl groups and the phosphorus atom being oxygen, and the haloalkyl groups of said trimonohaloalkyl thiophosphite being lower alkyl.

2. A method of defoliating cotton which comprises applying thereto when the plant contains bolls, in an amount effective to defoliate the cotton, a trimonochloroalkyl thiophosphite having 1 to 3 sulfur atoms linking the chloroalkyl groups to the phosphorus atom, the balance of the linking atoms between the alkyl groups and the phosphorus atom being oxygen, and the chloroalkyl groups of said trimonochloroalkyl thiophosphite being lower alkyl.

3. A method of defoliating cotton which comprises applying thereto when the plant contains bolls, in an amount effective to defoliate the cotton, tri(2-chloropropyl) monothiophosphite.

4. A method of defoliating cotton which comprises applying thereto when the plant contains bolls, in an amount effective to defoliate the cotton, tri(2-chloropropyl) trithiophosphite.

References Cited in the file of this patent

UNITED STATES PATENTS

| | | |
|---|---|---|
| 2,558,762 | Kohr | July 3, 1951 |
| 2,682,554 | Crouch et al. | June 29, 1954 |